United States Patent [19]

Emblem et al.

[11] Patent Number: 5,811,071
[45] Date of Patent: Sep. 22, 1998

[54] REFRACTORY OXIDES

[75] Inventors: Harold Garton Emblem, Southport; Thomas James Davies, Manchester, both of United Kingdom

[73] Assignee: Alcan International Limited, Montreal, Canada

[21] Appl. No.: 573,274

[22] Filed: Dec. 14, 1995

[30] Foreign Application Priority Data

Jun. 15, 1993 [GB] United Kingdom .................. 9312340

[51] Int. Cl.⁶ .................................................. C04B 35/02
[52] U.S. Cl. ........................... 423/596; 423/600; 501/12; 501/123; 501/132
[58] Field of Search ............................ 501/12, 123, 132; 423/607, 635, 596, 600

[56] References Cited

U.S. PATENT DOCUMENTS

| | | | |
|---|---|---|---|
| 4,897,232 | 1/1990 | Emblem et al. | 264/56 |
| 5,002,906 | 3/1991 | Soroka | 501/95 |
| 5,061,682 | 10/1991 | Aksay et al. | 501/132 |

FOREIGN PATENT DOCUMENTS

| | | | |
|---|---|---|---|
| 0 072 871 | 3/1983 | European Pat. Off. . | |
| 3-88713 | 4/1991 | Japan . | |
| 1 427 708 | 3/1976 | United Kingdom . | |
| WO 9429220 | 12/1994 | WIPO | 523/596 |

Primary Examiner—Paul Marcantoni
Attorney, Agent, or Firm—Browdy & Neimark

[57] ABSTRACT

A precursor, in gel form, of an oxide having the formula (I), $BaO.n(Al_{2x}Cr_{2y}O_3)$, where $1 \leq n \leq 6.6$, $(x+y)=1$, and $0 \leq y \leq 0.5$, said oxide being derivable from the precursor gel by the application of heat, is prepared by mixing a solution of a barium salt with a solution of an aluminium salt or a solution of an aluminium salt and a solution of a chromium salt, and polymerising the mixture to produce said precursor gel. A mixture suitable for firing to an oxide of the formula (II), $BaO.m(Al_{2x}Cr_{2y}O_3)$, where $4.6 \leq m \leq 6.6$; $(x+y)=1$; and $0 \leq y \leq 0.5$, comprises at least one of:

(a) barium oxide;
(b) a clean thermal precursor of barium oxide; and
(c) barium mono-aluminate, $BaO.Al_2O_3$; with at least one of:
(A) alumina, $Al_2O_3$;
(B) hydrated forms of alumina, such as boehmite, $Al_2O_3.H_2O$; and
(C) a clean thermal precursor of aluminium oxide; and, where y is not zero, with at least one of
(D) chromium(III) oxide, $Cr_2O_3$;
(E) hydrous chromium (III) oxide; and
(F) a clean thermal precursor of chromium (III) oxide, the relative amounts of the components of the mixture being adjusted to give the desired values of m and y when the mixture is heated.

24 Claims, No Drawings

REFRACTORY OXIDES

The present invention is a continuation-in-part of PCT/GB94/01280 filed Jun. 14, 1994, the entire contents of which are hereby incorporated herein by reference.

The present invention relates to oxides containing barium and aluminium.

More particularly, from a first aspect the invention relates to a method of preparing a precursor, in gel form, of an oxide having the formula (I), $BaO.n(Al_{2x}Cr_{2y}O_3)$, where $1 \leq n \leq 6.6$; $(x+y)=1$; and $0 \leq y \leq 0.5$, said oxide being derivable from the precursor gel by the application of heat, the method comprising mixing a solution of a barium salt with a solution of an aluminium salt or a solution of an aluminium salt and a solution of a chromium salt, and polymerising the mixture to produce said precursor gel.

Filaments may be produced from the gel as it is forming, and there is no need to use any organic binder or additive, as is customary. The gel may be formed via an intermediate sol.

This first aspect of the invention extends to a gel produced by the method set out above, whether or not in filament form, and to the preparation of an oxide of the formula (I) above by heating such a gel.

In this method a useful aluminium salt is an aluminium hydroxyhalide, although other salts, including aluminium alkoxides and aroxides, may be used. A useful barium salt is barium chloride, and an example of a useful chromium salt is chromium acetate.

Polymerisation may be brought about by the addition of a separate gelling agent such as ammonium acetate, citrate or lactate, for example (in principle any soluble carboxylic acid salt should be effective). Alternatively a barium, aluminium or chromium salt which is already present in the mixture may be sufficient of itself to produce polymerisation and gelling of the mixture; barium acetate is such a salt, and may supplement or replace other barium salts such as barium chloride. Gelling (polymerisation) may be brought about by hydrolysis, for example.

From a second aspect the invention provides a mixture suitable for firing to an oxide of the formula (II), $BaO.m(Al_{2x}Cr_{2y}O_3)$, where $4.6 \leq m \leq 6.6$; $(x+y)=1$; and $0 \leq y \leq 0.5$, said mixture comprising at least one of:

(a) barium oxide;

(b) a clean thermal precursor (as hereinafter defined) of barium oxide, such as barium carbonate or barium hydroxide; and (c) barium mono-aluminate, $BaO.Al_2O_3$; with at least one of:

(A) alumina, $Al_2O_3$;

(B) hydrated forms of alumina, such as boehmite, $Al_2O_3.H_2O$; and (C) a clean thermal precursor (as hereinafter defined) of aluminium oxide;

and, where y is not zero, with at least one of (D) chromium(III) oxide, $Cr_2O_3$;

(E) hydrous chromium (III) oxide; and (F) a clean thermal precursor (as hereinafter defined) of chromium (III) oxide.

the relative amounts of the components of the mixture being adjusted to give the desired values of m and y when the mixture is heated.

By "clean thermal precursor" is meant a material which will provide the desired oxide upon the application of heat with the production and loss of volatile by-products, preferably at a low temperature relative to the firing temperature for the production of an oxide of the formula (II). Typical precursors would include carbonates, hydrates, hydroxides, nitrates and carboxylates.

The mixture according to the second aspect may also include a precursor gel according to the first aspect of the invention.

Normally the components of the mixture would be ground together to facilitate reaction. Advantageously the ground particle size is less than 40 μm, preferably less than 10 μm, and more preferably less than 5 μm.

A cement or grouting mix may comprise a mixture according to the second aspect of the invention.

An oxide of formula (II) may be prepared by heating the mixture according to this second aspect of the invention.

The invention also relates to a grain mix for the preparation of ceramic and/or refractory bodies prepared by comminuting one, or a mixture of two, three or four of:

(a) a gel according to the first aspect of the invention;

(b) an oxide according to the first aspect of the invention;

(c) a mixture according to the second aspect of the invention; and (d) an oxide according to the second aspect of the invention.

Such a grain mix may or may not be prepared so that substantially all the particles have a size of less than 40 microns. This is particularly desirable when it is necessary to ensure that reaction occurs between different types of particle, as in the case of the mixture (c) as defined in the immediately preceding paragraph, or a mixture of any of the materials (a) to (d) as set out in the immediately preceding paragraph, particularly when such materials relate to different Ba:(Al+Cr) oxide ratios. Nevertheless, such a grain mix may be coarser, being produced, for example, by fusing a mixture (or the resulting oxide) according to the second aspect of the invention and crushing the product.

The invention also extends to a grain mixture in which additional particles with a grain size greater than 40 microns are incorporated into a grain mix according to the invention. These additional particles might have a composition differing from the composition of the particles of the grain mix.

Any of these grain mixes and mixtures may be used as components in any normal ceramic or refractory production process. Fine materials (less than 40 μm, and preferably less than 10 μm) can be pressed or slip cast into shapes and fired to give a sintered ceramic body. The fine material and/or crushed fused (coarser) material, by itself or in combination with other refractory materials, can be used in the production of refractory bricks. The gel according to the first aspect of the invention and/or the mixture according to the second aspect of the invention may be used to prepare a refractory green body which will form the mixed oxide when fired; this might prove particularly suitable for in situ production of the refractory body, as in castable refractory concrete production.

The invention will be described more particularly hereafter with reference to examples and some prior art.

Formation of Gels

The production of rigid gels from certain aluminium compounds is known. Thus European Patent Application Serial No. 0 063 034 A relates to the formation of a hydrolysate from an aluminium alkoxide or aroxide, which is then allowed to set solid to form the gel. Similarly British Patent Serial No. 1 427 708 relates to the treatment of an aluminium hydroxyhalide with an acetate or lactate which gives an alkaline aqueous solution to form a rigid coherent gel.

It is also known from European Patent Application Serial No. 0 197 686 and U.S. Pat. Ser. No. 4,897,232, that fibres can be produced from mixtures of aluminium compounds with other materials; however these two cases both involve the use of aluminium halohydrate organic complexes and other organic materials in the preparation of the fibres, It has now been found that a solution of an aluminium salt which also contains a barium salt in solution can be polymerised, e.g by hydrolysis, to a rigid gel which is capable of thermal decomposition to an oxide of the formula (I), where y is zero and the value of n is determined by the composition of the solution. While in principle the aluminium salt can be any soluble salt, one preferred salt is an aluminium halide, more preferably a chloride, and even more preferably a hydroxychloride, such as $Al_2(OH)_5Cl$. This latter material is conveniently available as an aqueous "Chlorhydrol" solution containing 23 to 24 weight percent aluminium expressed as $Al_2O_3$. ("Chlorhydrol" is a trade name used by Rheiss in Eire.)

Similarly the barium salt could be any soluble barium salt, but is preferably barium chloride, anhydrous or as $BaCl_2.2H_2O$.

Polymerisation to bring about formation of the gel may be by the addition of any suitable material. Thus it may be possible to use a lactate or acetate which provides an alkaline solution, or any such salt of a weak acid, but a preferred agent is ammonium citrate or acetate, for example ammonium acetate at a strength of 1 gm/ml. Alternatively it is possible to use one of the components of the mixed solutions which contributes a metal to the final oxide to bring about polymerisation—for example, at least part of the component contributing barium may be barium acetate for this purpose. Polymerisation may also be brought about by heating the solution at atmospheric pressure with or without the removal of volatiles, or under reduced pressure when volatiles will be removed.

It has also been found that it is possible to replace up to at least half of the aluminium in the gel and in the oxide of formula (I) by chromium, and for this purpose the soluble aluminium salt is substituted to a corresponding extent by a soluble chromium salt. The latter could be any soluble salt, but a preferred form is a chromium (III) acetate. This may be conveniently used in the form of a "CAC-75" aqueous solution containing 11 to 11.5 weight percent chromium expressed as the $Cr_2O_3$ equivalent, and 12.5 to 13.5 weight percent acetic acid equivalent.

An aluminium alkoxide or aroxide can be used as an aluminium salt in the formation of a rigid gel capable of thermal decomposition to an oxide of the formula (I), where y is zero and the value of n is determined by the composition of the solution. One suitable aluminium alkoxide is "Aliso B", which is an aluminium (iso-propoxide) (butoxide). When dissolved with barium chloride dihydrate in a mutual solvent, which may, for example, be ethylene glycol or triethanolamine, a solution which sets to a rigid gel is obtained. This gel is capable of thermal decomposition to give an oxide of the formula (I) where y is zero and the value of n is determined by the composition of the solution. Filaments can be drawn from the gel as it is forming. The "Aliso B" may be replaced wholly or in part by an aluminium chromium double alkoxide. When the "Aliso B" is wholly replaced by the double alkoxide, in formula (I) y has the value 0.5. Values of y between 0 and 0.5 may be obtained by using the appropriate quantities of "Aliso B" and the aluminium chromium double alkoxide.

The barium chloride can be replaced, wholly or in part, by barium acetate. Part or all of the ethyene glycol solvent may be replaced by acetylacetone.

EXAMPLES

Example 1

To 5 ml of a barium chloride—chlorhydrol solution providing a Ba:Al oxide ratio of 1:6 was added 1 ml of an ammonium acetate solution (of strength 10 gm in 25 ml of water) . The mixture took 2.5 minutes to form a clear coherent gel, which was elastic and gained strength rapidly.

Example 2

Example 1 was repeated but using only 0.5 ml of the ammonium acetate solution. The time to form a gel was 10 minutes, and the gel was clear, coherent, elastic at first, and showing good strength development. When scaled up 50 times, the gel time was measured as 12 minutes.

Example 3

Example 1 was varied in that the strength of the ammonium acetate solution was 1 gm/ml, and in that 1 ml of this solution was added per 5.3 gm of the barium chloride-chlorhydrol mixture. A hard transparent rigid gel was produced within 30 seconds.

Example 4 to 8

Example 3 was repeated but with addition to the chlorhydrol of CAC-75 in amounts equivalent to 5, 7, 10, 20 and 25 percent expressed as $Cr_2O_3:Al_2O_3$. The Ba: (Al+Cr) oxide ratio was maintained at 1:6. No gelation was observed to occur before addition of the ammonium acetate solution. The results are tabulated:

| Example | $Cr_2O_3:Al_2O_3$ (percent) | Gel Time | Gel |
|---|---|---|---|
| 4 | 5 | 3 minutes | elastic, hard after 30 min. |
| 5 | 7 | 1 minute | rigid |
| 6 | 10 | 3 minutes | elastic, hard after 30 min. |
| 7 | 20 | less than 30 seconds | rigid |
| 8 | 25 |  | rigid |

In each case the gel was clear or transparent.

Filament Formation

It has been found possible to produce filaments from the gel as it is forming, and to produce corresponding fibres of formula (I) on firing of the filaments. Initial experiments centred on the use of an aluminium chlorohydrate-propylene glycol complex ("aluminium chlorhydrex") as the source of the aluminium, but better results were obtained using "chlorhydrol". In the latter case, where the value of n in formula (I) is 6, and no chromium is present, it has been possible to produce a continuous filament by extrusion of the gel producing mixture through a spinnerette of diameter 0.5 or 1.0 mm. This was quite unexpected.

Filament Example 1

25 gm of aluminium chlorhydrex and 3.23 gm of anhydrous barium chloride were dissolved in solvent consisting of 50 ml of water, for a Ba:Al oxide ratio of 1:6, and 17.5 ml of solvent was removed by heating at atmospheric pressure. Filament formation assessed by withdrawing a 6 mm diameter glass rod from the solution indicated that filaments were poorly formed.

Filament Example 2

Filament Example 1 was repeated, but with the solvent consisting of 25 ml of water, and with removal of 17 ml of solvent by heating at atmospheric pressure. Filament formation was poor.

Filament Example 3

Filament Example 1 was repeated, but using a solvent consisting of 25 ml of ethanol and 40 ml of water. The mixture was held at 80° C. for 12 minutes with no solvent being removed. Filaments were again poorly formed.

Filament Example 4

A solution with a Ba:Al oxide ratio of 1:6 was prepared by dissolving barium chloride (either anhydrous or the dihydrate) in chlorhydrol solution. The mixture was held at 60° C. for 30 minutes. Filament formation, assessed as before, was poor. The addition of 33% v/v ethanol and 25% v/v water to this mixture, followed by heating at 60° C. for 20 minutes, provided a mixture which gave no filament formation. However, if this latter mixture is then cooled for 30 minutes, and then heated to 60° C. for 25 minutes, filaments about 25 cm long were obtained. These filaments were rather weak, but were capable of being handled.

Filament Example 5

A solution with a Ba:Al oxide ratio of 1:6 was prepared by dissolving barium chloride (either anhydrous or the dihydrate) in chlorhydrol solution. 5 ml ammonium acetate solution (strength: 40 gm per 100 ml water) was added to 50 ml of this solution, and the resulting mixture was extruded through a 0.5 mm diameter spinnerette. Filament formation occurred 15 minutes after the addition of the ammonium acetate, and was still possible 60 minutes later.

Filament Example 6

Filament Example 5 was repeated but using 10 ml of the ammonium acetate solution and a spinnerette hole diameter of 1.0 mm. Filament formation was possible 3 minutes after mixing, using an extrusion pressure of 689 to 754 $kN/m^2$ (100 to 110 psi).

Filament Example 7

Filament Example 6 was repeated but using 20 ml of the ammonium acetate solution. Filament formation was possible 3 minutes after mixing. After 10 to 14 minutes, continuous filaments could be obtained at an extrusion pressure of 1034 $kN/m^2$ (150 psi), rising to 1379 $kN/m^2$ (200 psi) at 17 minutes. At 20 minutes the gel became too rigid for filament formation by extrusion.

Filament Example 8

80 gm barium chloride dihydrate were dissolved in 848gm chlorhydrol solution, then to this solution was added water (100 gm) and ethylene glycol (50 gm). Solvent was removed by evaporation at 50°–55° C. under vacuum (water-pump). Time of evaporation was 90 minutes, 245 gm solvent being removed. When the solution was extruded through a spinnerette 0.5mm diameter, at 379 $kN/m^2$ (55 psi) extrusion pressure, very poor filaments of variable diameter were obtained.

Micronised $BaO.6Al_2O_3$ gel, average particle size 8 $\mu m$ was added to the solution (50% w/w). When this mixture was extruded through a spinnerette 1.0 mm diameter, at 754 $kN/m^2$ (110 psi), poor filaments were obtained. A spinnerette diameter 0.5 mm was too narrow for filament formation.

300 gm solution and 100 gm micronised $BaO.6Al_2O_3$ gel, average particle size 8 $\mu m$ were mixed, then more volatiles were removed by evaporation at 50°–55° C. under vacuum (water-pump). 28 gm volatiles were removed. The resulting suspension gave better filaments when extruded through a spinnerette 1.0 mm diameter at 754 $kN/m^2$ (110 psi).

Filament Example 9

80 gm barium chloride dihydrate were dissolved in 848 gm chlorhydrol solution, then to this solution was added water (100 gm) and ethylene glycol (50 gm). Solvent was removed by evaporation at 50°–55° C. under vacuum (water-pump). Time of evaporation was 90 minutes, 255 gm solvent being removed. 300 gm of the resulting solution and 100 gm $BaO.6Al_2O_3$ gel, dried at 150° C., then ground by high energy milling to particle size 8 $\mu m$ or less, were mixed for 3 hours, followed by removal of more volatiles by evaporation at 50°–55° C. under vacuum (water-pump), ca 30 gm volatiles being removed.

The resulting suspension was extruded through a spinnerette shaped to give a ribbon 4 mm×1 mm. It extruded satisfactorily at 520 psi to give a coherent ribbon, extrusion rate about 20 mm $min^{-1}$. The ribbon remained coherent when air-dried and remained coherent when fired at 1550° C.

Filament Example 10

A solution of "Aliso B" and barium acetate in the minimum amount of triethanolamine, in proportion equivalent an oxide ratio $BaO:Al_2O_3$ of 1:6, was warmed to between 50°–60° C. to cause polymerisation and to obtain a solution from which filaments could be drawn. EDAX analysis showed that the filaments, after drying at 100°, had the oxide composition $BaO.6Al_2O_3$.

Filament Example 11

A mixture of "Aliso B" and barium acetate in proportion equivalent an oxide ratio $BaO:Al_2O_3$ of 1:6, acetylacetone and water gave a solution which, on standing, set to a gel. Filaments could be drawn from the solution prior to gelation. Hydrolysis and polymerisation, and hence gelation, could be accelerated by warming the solution to between 50°–60° C. EDAX (energy dispersive X-ray) analysis showed that the filaments, after drying at 100°, had the oxide composition $BaO.6Al2O_3$.

Filament Example 12

A solution of "Aliso B" and barium acetate, in proportion equivalent an oxide ratio $BaO:Al_2O_3$ of 1:6, was dissolved in the minimum amount of a mixture of ethylene glycol and acetylacetone (equal parts by volume). The solution was warmed to between 50°–60° C. to cause polymerisation and to obtain a solution from which filaments could be drawn. EDAX analysis showed that the filaments, after drying at 100°, had the oxide composition $BaO.6Al_2O_3$.

Filament Example 13

A semi-rigid gel suitable for extrusion to obtain a filament was prepared from a mixture of barium acetate solution (1 g plus 2.5 g water) and barium chloride dihydrate crystals dissolved in solution (quantity to give n=6 in formula (I)). Up to 10 wt % of volatiles may be removed by heating. The weight ratio barium chloride: barium acetate should be about 8:2, with 7.42:2.58 being typical. Filaments were extruded from the semi-rigid gel (typically at 23° C. and 200 psi) or were drawn as the gel was forming. The filaments converted to a ceramic fibre ($BaO.6Al_2O_3$) on firing at 1400° C. for 4 hours.

Filament Example 14

CAC-75 chromium (iii) acetate solution was added to the barium acetate-barium chloride-chlorhydrol solution of Filament Example 13 (quantities to give n=6.6 and y=0.09 in formula (I)). As in Filament Example 13, removal of volatiles gave a semi-rigid gel from which filaments were extruded. The filaments converted to a ceramic fibre on firing at 1150° C.

Formation of Gel and Conversion to Oxide

A saturated solution of barium chloride dihydrate was added to chlorhydrol solution in an amount to give n=1 in formula (I).

The resulting solution was polymerised and gelled at ambient temperature with an equal quantity of ammonium acetate solution [25g in 27 cm$^3$ water]. The time required for the gel to form was about 60 minutes at ambient temperature and about 15 minutes at 30° C. The resulting gel was air-dried, then milled and sintered to form barium monoaluminate.

The gels as grain binders

The gels may be mixed with grains of, for example, alumina, chromium (III) oxide and/or solid solutions of aluminium oxide and chromium (III) oxide, to give grain mix compositions which are castable and can be used as such for forming articles, or for repairing or constructing furnaces or heat resisting linings (e.g. for ladles).

Example 9

To 25 ml of a mixture of chlorhydrol and barium chloride solutions affording an oxide ratio of Ba:Al of 1:6 was added 200 gm of tabular alumina grain mix to provide a slurry, and 2.5 ml ammonium acetate solution (10 gm in 25 ml water) as a gelation inducing agent. A refractory "green" shape prepared therefrom was air dried for 24 hours, then dried at 45° C. for 12 hours. It was then fired to 1000° C. over 2 hours, held there for 2 hours, fired to 1700° C. over 1 hour and held there for 2 hours to form a good refractory shape with good grain binding, as shown by optical microscopy. The flow properties of the slurry were good and the green shape was strong.

| | |
|---|---|
| 2 parts by weight of grain graded | 8 to 14 (BS 410–1986) |
| 1 part | 14 to 28 |
| 1 part | 28 to 48 |
| 1 part | 48 to 100 |
| 1 part | >100 |

Example 10

To 20 ml of a mixture of chlorhydrol, CAC-75, and barium chloride solutions, affording an oxide ratio in formula (I) of Ba:(Al+Cr) of 1:6 and a ratio of Al:Cr of 100:15, was added 200 gm of tabular alumina grain mix to provide a slurry, and 5.5 gm ammonium acetate in 5 ml water as a gelation inducing agent. The tabular alumina mix was that used in the previous example. A refractory "green" shape prepared therefrom was air dried for 48 hours, then fired to 1200° C., held there for 2 hours, and allowed to cool to ambient temperature, followed by firing at 1650° C. for 16 hours to form a good refractory shape.

Example 11

This example illustrates the preparation of a gel where no separate polymerising agent need be added and its use in fibre formation and as a grain binder. A mixture of solutions of barium chloride and barium acetate is combined with a chlorhydrol solution to provide a Ba:Al oxide ratio of 1:6, and a gel is subsequently formed at a rate dependent on the barium acetate to barium chloride ratio. Filaments can be produced from the gelling mixture, and it has been found that filament formation is improved by adding a micronised BaO.6Al$_2$O$_3$ gel to the mixture prior to filament formation. The filaments remain coherent when fired to 1550° C., giving reasonably strong ceramic fibres. The gel may also be used to bind an alumina grain mix to provide a material with satisfactory unfired strength.

Dry Process

Thus far, the particular description has related to a wet process for producing mixed oxides. However, it is also possible to form oxides of the formula (II), BaO.m (Al$_{2x}$Cr$_{2y}$O$_3$), where $4.6 \leq m \leq 6.6$; $(x+y)=1$; and $0 \leq y \leq 0.5$, by a dry process, in which a barium oxide affording or containing first component is mixed with an aluminium oxide affording or containing second component (and, where y is not zero, a chromium oxide affording or containing component) in amounts adjusted to give the desired value of m and y when the mixture is heated to form the oxide.

In a fundamental form of the process barium oxide, BaO, is mixed with aluminium oxide Al$_2$O$_3$ and optionally chromium oxide Cr$_2$O$_3$ to give a mixture according to the second aspect of the invention.

However the barium oxide may be replaced wholly or in part by a clean thermal precursor thereof, such as barium carbonate, barium hydroxide, or a hydrous oxide.

Similarly the aluminium oxide, which could be α-alumina, for example, or a mixture thereof with chromium oxide (including solid solutions), could be partially or entirely replaced by a clean thermal precursor thereof, including hydrous oxides, for example boehmite (Al$_2$O$_3$.H$_2$O). Replacement of some or all of an α-alumina component by boehmite may give improved mechanical properties, since a similar effect occurs with alumina-chromia refractories.

Furthermore, the first or second component may be replaced wholly or in part by an oxide of formula (I) having a Ba:Al oxide ratio different from that of the final oxide produced by heating the mixture, or a clean thermal precursor thereof. For example, an oxide of formula BaO.Al$_2$O$_3$, or a gel produced according to the first aspect of the invention which is a precursor of such an oxide, may form all or part of the first component.

Optionally, a gel produced according to the first aspect of the invention and having a Ba:Al oxide ratio the same as the final oxide produced by heating the mixture of first and second components, or the oxide produced on heating the gel, may be added to the first and second components.

Oxides of the formula (II) are highly refractory and have potential use as engineering ceramics and/or in refractory compositions. A typical oxide would be BaO.6Al$_2$O$_3$. In such a case, when a mixture containing barium carbonate and α-alumina, typically in the form of a compacted powder, is sintered, the first stage is the formation and densification of BaO.Al$_2$O$_3$ (1100° to 1400° C.). This is followed by the formation of BaO.6Al$_2$O$_3$ at 1400° to 1500° C., which involves an increase in volume, and densification at 1600° to 1700° C., accompanied by a decrease in volume.

The volume expansion accompanying the formation of oxides of the formula (II) suggests the use of the mixture comprising the first and second components in the production of bricks and ceramic shapes, as well as a grouting mix, e.g. for kilns and furnaces. The formation of an interlocking network of crystals during firing will give strength at high temperatures.

One possible procedure for preparing engineering ceramics would be to compact and sinter the mixture containing the first and second components (in amounts appropriate for m=6, for example) to (say) 1300° to 1400° C., grind the product finely, e.g. less than 100 $\mu$m, preferably less than 40 $\mu$m, more preferably less than 10 $\mu$m, and still more preferably less than 5 $\mu$m.

At this stage, some $BaO.6Al_2O_3$ precursor material obtained by sintering the corresponding gel material provided according to the first aspect of the invention is optionally added, to act as a binder. Thereafter the material is shaped and sintered to 1500° C. A preferred procedure for shaping would be isostatic pressing, although other procedures, including uniaxial pressing, are possible. Another preferred procedure for shaping would be uniaxial pressing followed by isostatic pressing.

Clearly it would be possible to incorporate other materials into the mix prior to the final sintering step so long as they do not undesirably affect the formation of the oxide of formula (II).

The particle size of further materials added to the micron sized ground mix prior to the final sintering is not necessarily similar to the particle size of the mix, and may be considerable greater than 40 $\mu$m. Larger particles may be of such materials as mullite and other aluminosilicates, zircon and alumina; however, they may also be of the same composition as the micron sized particles.

These larger particles may also be, for example, of alumina (fused/calcined/hydrous, and including tabular and $\alpha$-alumina), chromium (III) oxide (sintered/hydrous), and solid solutions of chromium(III) and aluminium (III) oxides. In the latter, chromium oxide is preferably present in the range 2 to 5 weight percent or 7 to 14 weight percent (as $Cr_2O_3:Al_2O_3$).

The amount of the larger particles in the mix for final sintering is preferably not greater than 30 weight percent.

Example 12

A mix of $Ba(OH)_2.2H_2O$ and alumina, $Al_2O_3$, of average particle size 75 $\mu$m, and with a Ba:Al oxide ratio of 1:6 was blended for 12 hours in a ball mill and compacted at 100 MPa in a steel die prior to sintering, during which the temperature was held at 110° C. for 20 minutes, held at 450° C. for 20 minutes, and held at 1600° C. for 4 hours.

The resulting sinter product was comminuted in a ball mill to give a grain mix from which ceramic shapes were prepared by compaction at 100 MPa, followed by sintering at 1750° C. (30 minutes for small shapes, somewhat longer for larger shapes).

Example 13

A mix of barium carbonate and RA207LS alumina (mean particle size 0.5 $\mu$m; $Na_2O$, 0.08 weight percent; surface area 7.00 $m^2g^{-1}$) with a $BaO:Al_2O_3$ ratio of 1:6 was blended for 12 hours in a ball mill, to break down particle aggregates, then sintered at 1200° C. The resulting powder was compacted uniaxially at 100 MPa, then isostatically (cold) at 1723 MPa to give test bars which were sintered at 1700° C. for 2 hours. The modulus of rupture was determined at ambient temperature by four-point bend testing. the results were:

(Mean) Modulus of rupture 276 MPa;

Weibull modulus 7.4;

Density at ambient temperature was 1760 kg $m^{-3}$.

Test bars were also prepared by re-milling the powder obtained after sintering, then compacting the re-milled powder at 100 MPa uniaxially, followed by a further compaction isostatically at 1723 MPa (cold) and sintering for 2 hours at 1700° C. The modulus of rupture was determined at ambient temperature by four-point bend testing. The results were:

(Mean) Modulus of rupture 370 MPa;

Weibull modulus 8.3;

Density at ambient temperature was 1940 kg $m^{-3}$.

Example 14

A mix of barium carbonate and RA107LS alumina (mean particle size 0.5 $\mu$m; $Na_2O$, 0.05 weight percent; surface area 6.70 $m^2g^{-1}$) with a $BaO:Al_2O_3$ ratio of 1:6 was blended for 12 hours in a ball mill, to break down particle aggregates, then sintered at 1200° C. The resulting powder was compacted uniaxially at 100 MPa, then isostatically (cold) at 1723 MPa to give test bars which were sintered at 1700° C. for 2. hours. The modulus of rupture was determined at ambient temperature by four-point bend testing. The results were:

(Mean) Modulus of rupture 392 MPa;

Weibull modulus 4.8;

Density at ambient temperature was 2550 kg $m^{-3}$.

Test bars were also prepared by re-milling the powder obtained after sintering, then compacting the re-milled powder at 100 MPa uniaxially, followed by a further compaction isostatically at 1723 MPa (cold) and sintering at 1700° C. for 2 hours. The modulus of rupture was determined at ambient temperature by four-point bend testing. The results were:

(Mean) Modulus of rupture 632 MPa;

Weibull modulus 5.3;

Density at ambient temperature was 3240 kg $mn^{-3}$.

It is also possible to form oxides of the formula (II) $SrO.m(Al_{2x}Cr_2yO_3)$ where $2.0 \leq y \leq 6$—6; $(x+y)=1$ and $0 \leq y \leq 0.5$ by a dry process in which astrontium oxide affording or containing first component is mixed with an aluminium oxide affording or containing second component (and, when y is not zero, a chromium oxide affording or containing component) in amounts adjusted to give the desired value of m and y when the mixture is heated to form the oxide.

Thus, in a third aspect, the invention provides a mixture suitable for firing to an oxide of the formula (III) $SrO.m(Al_{2x}Cr_{2y}O_3)$ where $2.0 \leq m \leq 6$—6; $(x+y)=1$ and $0 \leq y=0.5$ said mixture comprising at least one of (a) strontium oxide (b) a clean thermal precursor (as hereinafter defined) of strontium oxide, such as strontium hydroxide or strontium carbonate; and (c) strontium mono-aluminate $SrO.Al_2O_3$ or tristrontium mono-aluminate $3SrO.Al_2O_3$; with at least one of (A) alumina $Al_2O_3$;

(B) hydrated forms of alumina, such as boehmite, $Al_2O_3.H_2O$; and (C) a clean thermal precursor (as hereinafter defined) of aluminium oxide; and, when y is not zero, with at least one of (D) chromium (iii) oxide (E) hydrous chromium (iii) oxide; and (F) a clean thermal precursor (as hereinafter defined) of chromium (iii) oxide, the relative amounts of the mixture being adjusted to give the desired values of m and y when the mixture is heated.

In a preferred formula (III), m is 6 and y is zero.

This third aspect will be described more particularly hereafter with reference to a preferred example.

In a simple form of the invention according to the third aspect, strontium oxide SrO is mixed with aluminium oxide $Al_2O_3$ and optionally chromium oxide $Cr_2O_3$. However, the strontium oxide may be replaced wholly or in part by a clean thermal precursor thereof, such as strontium carbonate, strontium hydroxide or a hydrous oxide. Similarly the aluminium oxide, which could be α-alumina, for example, or a mixture thereof with chromium oxide (including solid solutions), could be partially or entirely replaced by aclean thermal precursor thereof, including hydrous oxides, for example boehmite $Al_2O_3.H_2O$. Replacement of some or all of an α-alumina component by boehmite may give improved mechanical properties, since a similar effect occurs with alumina-chromia refractories. Oxides of the formula (III) are refractory and have potential use as engineering ceramics and/or in refractory compositions. A preferred oxide is $SrO.6Al_2O_3$.

One possible procedure for preparing engineering ceramics would be to compact and sinter the mixture containing the first and second components (in amounts appropriate for m=6, with y being zero, for example) after high energy milling to break down particle aggregates, then sinter to (say) 1300°–1400° C., then grind the product finely, e.g. less than 100 $\mu$m, preferably less than 40 $\mu$m and still more preferably less than 5 $\mu$m. The resulting material its shaped and sintered to 1500° C. or higher. A preferred procedure for shaping would be isostatic pressing, although other procedures, including uniaxial pressing, are possible. Another preferred procedure for shaping would be uniaxial pressure followed by isostatic pressing. As for the barium containing oxides of formula (II), other materials may be incorporated prior to the final sintering stage so long as they do not undesirably affect the formation of the strontium containing oxides of formula (III). These other materials which are incorporated can be the same as and have a similar particle size as the materials incorporated with the barium containing oxides of formula (II).

EXAMPLE

A mix of strontium carbonate and RA 107 L5 alumina (mean particle size 0.5 $\mu$m; $Na_2O$ 0.05 weight percent, surface area 6.70 $m^2g^{-1}$) with a $SrO:Al_2O_3$ ratio of 1:6 was blended for 12 hours in a ball mill to break down particle aggregates, then sintered at 1200° C. This gave a powder suitable for compaction to form engineering ceramics, after sintering the compostat 1500–1700° C.

Engineering ceramics may also be prepared by re-milling the powder obtained after sintering, then compacting the remilled powder uniaxially followed by a further compaction isostatically, then sintering at 1500–1700° C. RA 207LS alumina (mean particle size 0.5 $\mu$m; $Na_2O$ 0.08 weight percent: surface area 7.00 $m^2g^{-1}$) may be substituted for RA107LS alumina.

We claim:

1. A method of preparing an oxide precursor, in rigid gel form, the oxide having the formula (I), $BaO.n(Al_{2x}Cr_{2y}O_3)$, where $1 \leq n \leq 6.6$, $(x+y)=1$, and $0 \leq y \leq 0.5$, which oxide is derivable from the precursor gel by the application of heat, the method comprising mixing a solution of a barium salt with a solution of an aluminum compound and a solution of a chromium salt, and polymerising the mixture under basic conditions to produce said rigid precursor gel.

2. A method according to claim 1 wherein the aluminium compound is an aluminium hydroxyhalide, alkoxide or aroxide.

3. A method according to claim 1 wherein the polymerising is effected by adding a separate polymerising agent.

4. A method according to claim 1 wherein at least part of the barium, or chromium salt or the aluminium compound is such as to produce polymerisation of the mixture.

5. A method according to claim 1 wherein rigid filaments are produced from the mixture as it is gelling.

6. A rigid gel produced by the method of claim 1.

7. A method of preparing an oxide of the formula (I) $BaO.n(Al_{2x}Cr_{2y}O_3)$, where $1 \leq n \leq 6.6$; $(x+y)=1$; and $0 \leq y \leq 0.5$, by heating a rigid gel according to claim 6.

8. An oxide prepared by the method of claim 7.

9. A mixture suitable upon firing for conversion to an oxide of the formula (II), $BaO.m(Al_{2x}Cr_{2y}O_3)$, where $4.6 \leq m \leq 6.6$; $(x+y)=1$; and $0 \leq y \leq 0.5$, said mixture comprising at least one of:

(a) barium oxide;

(b) a clean thermal precursor of barium oxide; and (c) barium mono-aluminate; with at least one of:
(A) alumina;
(B) hydrated forms of alumina; and
(C) a clean thermal precursor (as hereinbefore defined) of aluminium oxide; and, where y is not zero, with at least one of
(D) chromium(III) oxide, $Cr_2O_3$;
(E) hydrous chromium (III) oxide; and
(F) a clean thermal precursor of chromium (III) oxide, the relative amounts of the components of the mixture being adjusted to give the above values of m and y when the mixture is heated.

10. A mixture according to claim 9 which also includes an oxide precursor in rigid gel form which oxide has the formula (I), $BaO.n(Al_{2x}Cr_{2y}O_3)$, where $1 \leq n \leq 6.6$, $(x+y)=1$, and $0 \leq y \leq 0.5$, said oxide being derivable from the gel precursor by the application of heat, and said gel precursor being made by mixing a solution of a barium salt with a solution of an aluminium compound or a solution of an aluminium compound and a solution of a chromium salt, and polymerising the mixture.

11. An oxide of formula (II) prepared by heating a mixture according to claim 9.

12. An oxide of formula (II) prepared by heating a mixture according to claim 10.

13. A grain mix suitable for forming a refractory or ceramic article prepared by comminuting one, or a mixture of at least two of:

(a) an oxide precursor in rigid gel form, which oxide has the formula (I) $BaO.n(Al_{2x}Cr_{2y}O_3)$, where $1 \leq n \leq 6.6$, $(x+y)=1$, and $0 \leq y \leq 0.5$, the oxide being derivable from the precursor gel by the application of heat, and said precursor gel being made by mixing a solution of a barium salt with a solution of an aluminium compound or a solution of an aluminium compound and a solution of a chromium salt, and polymerising the mixture;

(b) an oxide of formula (I) prepared by heating the precursor gel defined in (a);

(c) a mixture suitable for firing to an oxide of the formula (II), $BaO.m(Al_{2x}Cr_{2y}O_3)$, where $4.6 \leq m \leq 6.6$, $(x+y)=1$, and $0 \leq y \leq 0.5$, said mixture comprising at least one of:
(i) barium oxide;
(ii) a clean thermal precursor of barium oxide; and
(iii) barium mono-aluminate; with at least one of:
(A) alumina;
(B) hydrated forms of alumina, and
(C) a clean thermal precursor of aluminium oxide;

and, where y is not zero, with at least one of
(D) chromium (III) oxide;
(E) hydrous chromium (III) oxide; and
(F) a clean thermal precursor of chromium (III) oxide,
the amounts of the components of the mixture being adjusted to give the above values of m and y when the mixture is heated;

(d) an oxide of formula (II) prepared by heating a mixture (c);

(e) an oxide prepared by heating a mixture (c) with a precursor gel (a).

14. A grain mix according to claim 13 wherein substantially all the particles have a size of less than 40 microns.

15. A grain mixture for the preparation of a ceramic refractory body comprising a grain-mix according to claim 14 and incorporating additional particles with a grain size greater than 40 microns.

16. A grain mixture according to claim 15 wherein at least some of the additional particles have a composition differing from the composition of the particles of the grain mix.

17. A grain Fix according to claim 16 wherein the different material is at least one of $Al_2O_3$ grain and/or $Cr_2O_3$, a grain comprising a solid solution of $Al_2O_3$ and $Cr_2O_3$.

18. A ceramic or refractory shaped article prepared by firing a grain mix according to claim 13.

19. A ceramic or refractory shaped article prepared by firing a grain mixture according to claim 15.

20. A cement or grouting mix comprising a mixture according to claim 9.

21. A mixture suitable for firing to an oxide of the formula (III) $SrO.m(Al_{2x}Cr_{2y}O_3)$ where $2.0 \leq m \leq 6.6$; $(x+y)=1$ and $0 \leq y \leq 0.5$, said mixture consisting essentially of at least one of (a) strontium oxide
(b) a clean thermal precursor of strontium oxide; and
(c) strontium mono-aluminate or tri-strontium mono-aluminate; with at least one of
(A) alumina $Al_2O_3$;
(B) hydrated forms of alumina and
(C) a clean thermal precursor of aluminium oxide; and, when y is not zero, with at least one of
(D) chromium (iii) oxide
(E) hydrous chromium (iii) oxide; and
(F) a clean thermal precursor of chromium (iii) oxide, the relative amounts of the mixture being adjusted to give the above values of m and y when the mixture is heated.

22. A mixture according to claim 9 wherein said clean thermal precursor of barium oxide is barium carbonate or barium hydroxide, said hydrated form of alumina is boehmite, or both said clean thermal precursor is barium carbonate or barium hydroxide and said hydrated form of alumina is boehmite.

23. A grain mix according to claim 13 wherein said clean thermal precursor of barium oxide is barium carbonate or barium hydroxide, said hydrated form of alumina is boehmite, or both said clean thermal precursor is barium carbonate or barium hydroxide and said hydrated form of alumina is boehmite.

24. A mixture according to claim 21 wherein said clean thermal precursor of strontium oxide is strontium hydroxide or strontium carbonate, said hydrated form of alumina is boehmite, or both said clean thermal precursor is barium carbonate or barium hydroxide and said hydrated form of alumina is boehmite.

* * * * *